C. H. BICALKY.
LOCKING PIPE JOINT.
APPLICATION FILED DEC. 3, 1907.

1,005,145.

Patented Oct. 10, 1911.

Witnesses:
Richard Sommer.
Gustav W. Hora.

Charles H. Bicalky,
Inventor
by Geyer & Popp
Attorneys.

UNITED STATES PATENT OFFICE.

CHARLES H. BICALKY, OF BUFFALO, NEW YORK.

LOCKING PIPE-JOINT.

1,005,145.　　　　Specification of Letters Patent.　　Patented Oct. 10, 1911.

Application filed December 3, 1907. Serial No. 404,913.

*To all whom it may concern:*

Be it known that I, CHARLES H. BICALKY, a citizen of the United States, residing at Buffalo, in the county of Erie and State of New York, have invented a new and useful Improvement in Locking Pipe-Joints, of which the following is a specification.

This invention relates to a pipe-joint designed more particularly for stove-pipe sections, but equally applicable to other telescopic piping, such as furnace, ventilating or blower piping.

The object of my invention is to provide such pipe-sections with simple and convenient means for interlocking them, in such manner that they cannot accidentally come apart.

A further object is the provision of a locking joint of this kind which is easily constructed and does not increase the cost of the piping.

Figure 1:
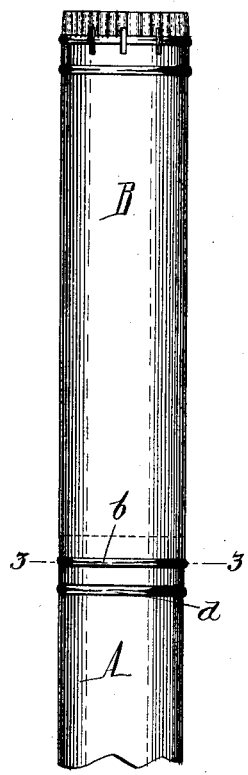
Figure 2:
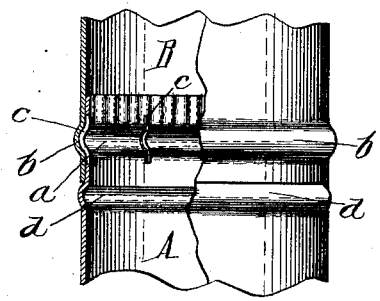
Figure 3:
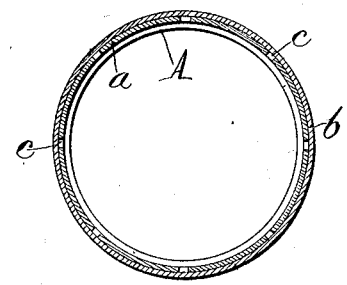
Figure 4:
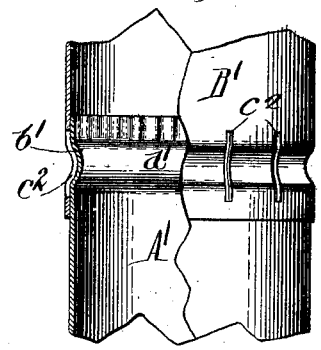

In the accompanying drawings: Figure 1 is a side elevation of a pair of interlocked stove-pipe sections embodying the invention. Fig. 2 is a sectional elevation of the joint on an enlarged scale. Fig. 3 is a transverse section in line 3—3, Fig. 1. Fig. 4 is a sectional elevation similar to Fig. 2, showing a modified construction of the joint.

Similar letters of reference indicate corresponding parts throughout the several views.

Referring to the construction shown in Figs. 1, 2 and 3, A indicates the inner and B the outer of two telescoping pipes or pipe-sections. The outer pipe B is provided at a short distance from its end with a groove or depression $b$, preferably of annular form which may be produced by rolling the usual bead in the pipe, as shown.

The inner pipe A is provided near its end with a shoulder or projection $a$ which interlocks with the groove $b$ of the outer pipe B for resisting endwise displacement of the telescoped pipes on each other. This shoulder preferably consists of an annular bead formed on the exterior of the inner pipe, as shown.

The portion of the pipe having the bead or shoulder $a$ is rendered elastic or yielding by any suitable means, so that upon telescoping the pipes and forcing them home, the bead $a$ will spring inwardly and allow the grooved portion of the outer pipe to snap over it, as shown in Fig. 1, thus automatically interlocking the pipes and requiring a considerable pull to disconnect them. The preferred means for giving the beaded inner pipe the requisite elasticity for this purpose consists of a series of slots $c$ arranged at suitable intervals around the pipe and intersecting the bead or shoulder $a$. By this construction, the portions of metal between the slots $c$ practically form springs or elastic tongues each carrying a segment of the bead or shoulder $a$. The slots may extend a suitable distance beyond one or both sides of said shoulder, but they preferably terminate short of the end of the pipe in which they are formed, in order to give the spring bead the necessary stiffness and leave said end intact and continuous like an ordinary stove-pipe length or section, as shown in the drawings.

If desired, the tapered end of the inner pipe may be crimped, as illustrated in the drawings. In order to form a stop for the end of the outer pipe and improve the appearance of the joint, the inner pipe may be provided with a second external bead or shoulder $d$, as shown, but the latter may be omitted, if desired.

It is obvious that the male and female members of the locking joint might be reversed, as shown in Fig. 4. In this modification, the inner pipe $A^1$ has an annular groove $d^1$ and the outer pipe $B^1$ has an internal annular bead $b^1$ which interlocks with said groove and is intersected by slots $c^2$.

It is evident from these different embodiments of the invention that the same may be variously modified without departing from its scope or spirit, and I do not therefore wish to be understood as limiting myself to the particular constructions herein shown and described.

In each form of the invention herein illustrated and described, the pipes are automatically interlocked in the act of telescoping and shoving them lengthwise on each other, enabling them to be connected with the same facility as ordinary pipe lengths which are held together by frictional contact only. As the lock involves no separate or additional parts but is integral with the pipe sections, it does not increase their cost.

While reliably locking the pipe-sections together, the joint at the same time permits one section to be turned on the other like an ordinary non-locking telescopic joint; this feature being important in the case of elbows which require to be adjusted at different angles.

I claim as my invention:—

1. A pipe-joint in which the pipe-sections are automatically interlocked by telescoping them, comprising sheet-metal pipe-sections provided respectively with male and female beads adapted to interlock with each other, one of said beads being provided with slots intersecting the same and terminating short of the end of the pipe section.

2. A pipe-joint comprising telescoping pipes, one of which is provided with a depression, and the other with a bead interlocking with said depression, said bead having slots intersecting the same and terminating short of the end of the pipe, substantially as set forth.

3. A sheet metal pipe-section provided adjacent to its end with an annular bead having slots intersecting the same and terminating short of the end of the section.

Witness my hand this 23d day of November, 1907.

CHARLES H. BICALKY.

Witnesses:
C. F. GEYER,
E. M. GRAHAM.

---

Copies of this patent may be obtained for five cents each, by addressing the "Commissioner of Patents, Washington, D. C."